Feb. 17, 1959  R. M. WARNER  2,873,605
APPARATUS FOR MEASURING EQUILIBRIUM HUMIDITY OF PAPER
Filed July 15, 1954  2 Sheets-Sheet 1

Inventor
ROGER M. WARNER
By Frederick G. L. Boyer
Attorney

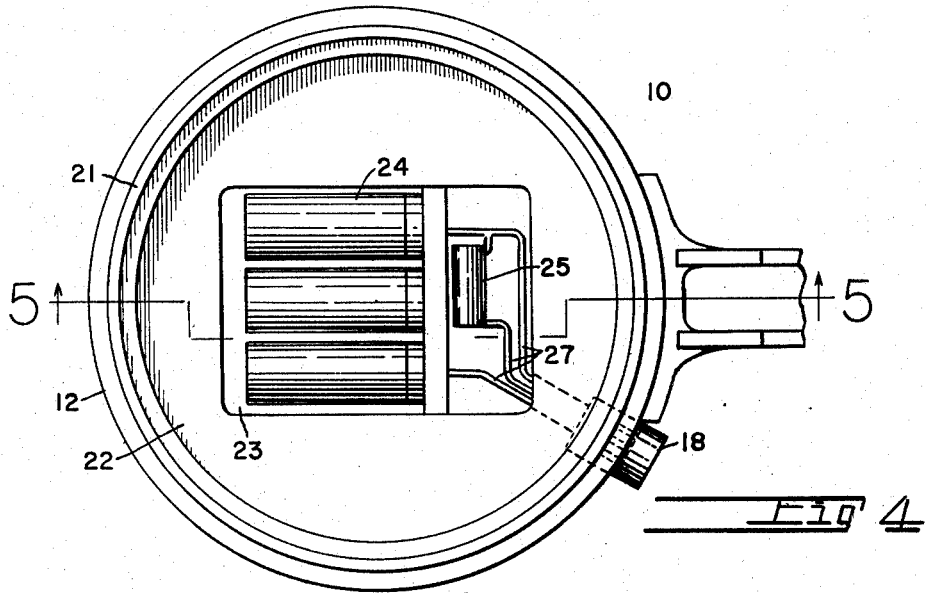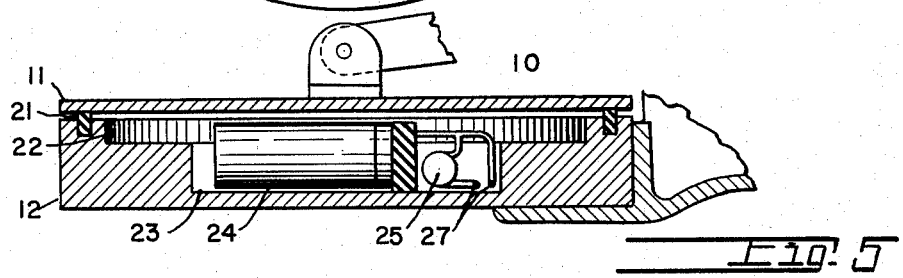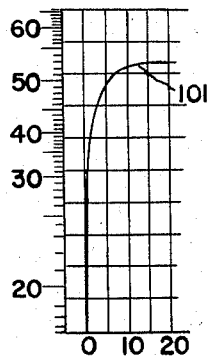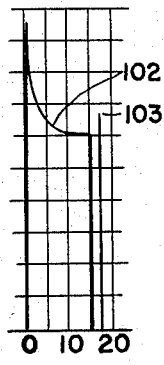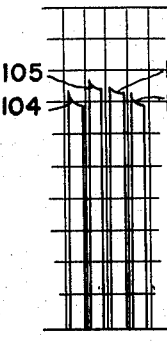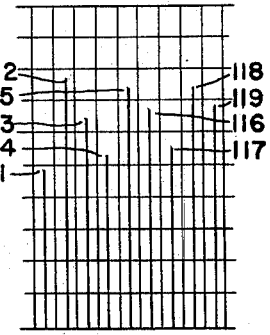

2,873,605

APPARATUS FOR MEASURING EQUILIBRIUM HUMIDITY OF PAPER

Roger M. Warner, Hamilton, Ohio, assignor to The Champion Paper and Fibre Company, Hamilton, Ohio, a corporation of Ohio Application July 15, 1954, Serial No. 443,610

2 Claims. (Cl. 73—73)

This invention relates to methods and apparatus for determining the moisture content of paper in terms of the relative humidity with which it is in equilibrium, herein called "equilibrium humidity." Measurement of the moislack of equilibrium between the moisture content of paper and humidity of the atmosphere in the room where the paper is stored, handled, converted, or printed, results in gain or loss of moisture by those parts of the paper in contact with the atmosphere. Such gain or loss in moisture results in swelling or shrinking of the paper where the changes occur, thus causing such troubles as wavy edges, buckles, curl, lack of register in printing, etc. It is, therefore, important for printers and others to be able to know if, and by how much the moisture content of the paper differs from equilibrium with the atmosphere of the room in which it is to be printed, converted, or otherwise handled. Printers and converters are, for this reason, coming more and more to control the relative humidity in their workrooms and to specify the equilibrium humidity they desire in paper they purchase. It is, therefore, also important for the paper manufacturer to know the equilibrium humidity of the paper he manufactures and delivers to his customers.

The present invention has, for its object, the provision of a method and apparatus by which the equilibrium humidity of paper can be readily and accurately measured, by which an autographic record of the measurements may be made, and which deviations from a specified uniform equilibrium humidity can be quickly detected and estimated.

I have found that these objects can be conveniently accomplished by placing one or more flat sheets of paper, or the edge portions of larger sheets, in a container of limited volume, containing a humidity sensing element, sealing this paper, preferably with the flat form undisturbed, in said container, and reading, or recording, the relative humidity of the air in said container, as it approaches, or after it has reached, equilibrium with the moisture content of the inserted paper. If it is desired to know the exact equilibrium humidity, the paper should be left sealed in the container until the enclosed air has time to reach equilibrium with the enclosed paper, which may be from ten to fifteen minutes if the equilibrium humidity of the paper differs greatly from the relative humidity of the air in the container. If, on the other hand, it is merely desired to know whether the paper sample is above or below the humidity of the air in the containers, which may be room air, or air in equilibrium with the last sample tested, it is only necessary to seal the sample in the container and watch the indication of humidity sensed by the enclosed sensing elements until it becomes apparent whether the reading is increasing or decreasing. Observation of the rate of increase or decrease in the reading will enable one who has become skilled in the use of the instrument to quickly estimate the approximate difference between the equilibrium humidity of the sample and the relative humidity of the air in the container at the beginning of the test.

For carrying out this process, I provide a container of a size which can conveniently be carried in one hand, and which is preferably provided with a handle for that purpose. This container is desirably shallow and of an area which is large in comparison with its depth. It is open on one of its larger sides and is provided with a cover for the open side. This cover is advantageously flat on its under side so that one or more flat sheets of paper of an area as large as, or larger than, the cover can be placed thereagainst and the whole pressed onto the open side of the container, thereby effectively sealing that portion of the paper within the container during the test. To hold this cover tightly against the open top of the container, pressure is applied to the cover at or near its center. A gasket may be provided, if desired, between the rim of the container and the cover, in order to improve the seal. For convenience in use and to provide a tight seal which can, without undue effort be maintained for prolonged periods and then easily released, the pressure is advantageously applied and released by means of a toggle joint. For further convenience and to make possible a one-hand operation of the device to clamp and release the paper to be tested, the pressure is desirably applied to the cover, by a lever pivoted to the handle in such a manner that it can be grasped, together with the handle, in one hand and operated by tightening or loosening the grip thereon.

The humidity sensitive element, which may be of known type, is mounted within the aforesaid container, while the indicating and/or recording devices which are of a type appropriate to the humidity sensitive element used, are desirably located outside the container where they may be read while the paper being tested is sealed within the container. While the present invention is not dependent on the type of humidity sensitive element used, I have found humidity-variable-electrical-resistance elements of known type to be suitable for use in the present process. When using these elements it is only necessary to have suitable wires connecting the elements inside the container with the recording or indicating devices outside. A detachable connector is advantageously provided particularly where the indicating and/or recording devices are not readily portable, so that the container can be detached from the indicating devices and carried to the location of the paper to be tested which can then be sealed in the test chamber with a minimum of exposure to the atmosphere and a minimum of opportunity to gain or lose moisture, before being sealed in the test chamber.

In order to increase the accuracy of measurement which can be secured, the humidity sensitive element may advantageously be mounted within a recess in the interior of the container in order to reduce the volume of the space within which the humidity must be brought to equilibrium with the paper sample. However, unless the space inside the container is unnecessarily large with reference to the weight of the paper sample being tested, the gain or loss of moisture by the paper required to bring the humidity within the container into equilibrium therewith, will be well within the usual limits of accuracy of humidity measurements. Particularly in case of thin papers, however, it may sometimes be desired to insert a plurality of sheets together in order to increase the ratio of the moisture capacity of the paper to that of the space within the container.

Further, relative humidity as related to moisture content being dependent on temperature, I advantageously provide means for ascertaining the temperature of the unit at the time of the test. This may be a thermometer mounted directly on the container, or in case electrical humidity sensing devices are used, it is convenient to provide an electrical temperature sensitive device also mounted inside the container so that humidity and temperature can be indicated and/or recorded on the same instrument.

The invention will now be more particularly described with reference to the accompanying drawings in which:

Fig. 4 is a plan view, on a somewhat larger scale and with the handle partly broken away, of the container with the cover removed to show the location of the electrical humidity and temperature sensing elements.

Fig. 5 is a sectional view taken on line 5—5 in Fig. 4.

Fig. 6 illustrates a fragment of a chart containing an autographic record of one test wherein the equilibrium humidity of the paper was far above the relative humidity within the container.

Fig. 7 illustrates a similar fragment of a chart in which the humidity differences are opposite of those in Fig. 6. It also shows inclusion of an autographic temperature record.

Fig. 8 illustrates a fragment of a chart showing autographic records of four successive tests in which the equilibrium humidity of the paper tested was only slightly lower than the humidity within the container.

Fig. 9 illustrates a section of a chart showing another method of using the invention.

Figure 1:
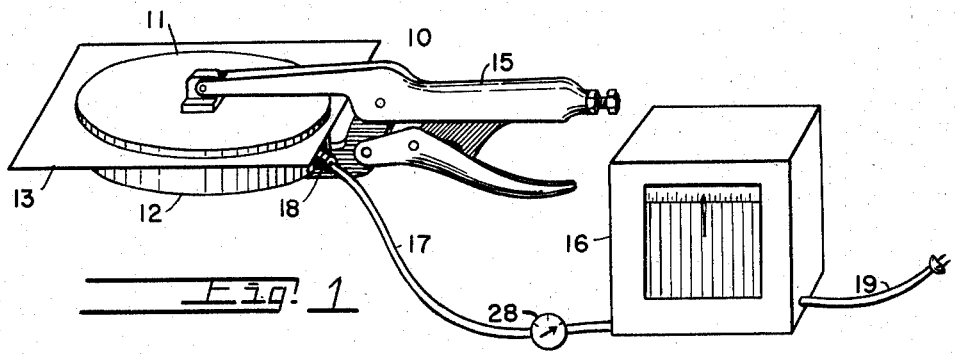
Fig. 1 is an overall pictorial view of a device for measuring and recording the equilibrium humidity of paper in accordance with the present invention.

Referring first to Fig. 1. The clamp, as a whole, is designated by numeral 10. The lid 11 is held onto the container 12 in a manner to firmly grasp single or multiple thicknesses of paper 13, by means of a toggle clamping handle designated generally 15, which will be more particularly described hereinafter. An indicating recorder 16 of suitable known or commercial type is connected by an electric cord 17 and detachable connecting plug 18 to the humidity sensitive elements within housing 12, as hereinafter more particularly described. An electric cord 19 may be provided, for connecting the recorder to a source of electric power, or if only an indicator is to be used instead of a recorder, it may be powered by batteries, not shown, if desired to render the device more readily portable.

Figure 2:
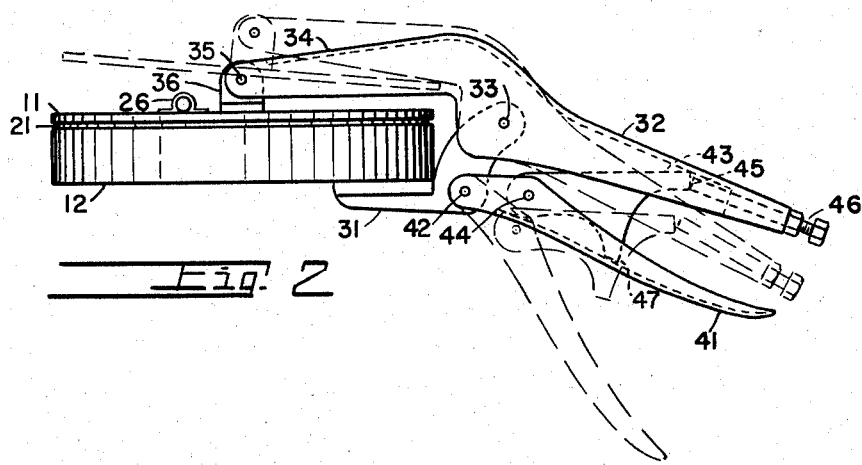
Fig. 2 is an elevational view of the container with its cover and handle, which together are herein called the "clamp" showing the cover in its locked position and, in broken lines the position of the parts with the cover in its open position.

The container 12, as illustrated in Figs. 1 to 5, is conveniently cylindrical in form, but may be square or of other form if desired. In order to make possible a more perefect seal, a gasket 21 (Figs. 4 and 5) may advantageously be provided. The interior 22 of the container is desirably of limited depth with a recess 23 provided to accommodate the humidity sensing element 24 which is advantageously of the known lithium chloride type of humidity - variable - electrical-resistance element. These elements are available in single or multiple units in accordance with the range of relative humidities which it is desired to measure. The drawing shows a three-unit element, but it is obvious that more or fewer units can be used in accordance with the range desired for the instrument. When using a humidity-variable-electrical-resistance element as shown, it is generally most convenient to use a temperature-variable-electrical-resistance element 25 for determining the temperature, as illustrated in Figs. 4 and 5. Otherwise, I can use a mercury thermometer 26 mounted on the cover 11, as illustrated in Fig. 2, for this purpose. The container 12 and cover 11 may be made of any suitable material which will not lose or gain moisture to or from the inclosed air to any significant extent.

The lead wires 27 from the humidity and temperature sensitive elements 24 and 25, respectively, pass into the wall of the recess 23 and are joined to the socket portion of connector 18 which may protrude from the container 12 and into which the plug portion of connector 18 can be inserted, to connect the sensing elements to the indicating recorder 16. These wires 27 and the connector socket 18 are desirably sealed into the walls of container 12 with an air and moisture proof seal to prevent outside air from affecting the humidity within the container during a measurement.

When using the temperature and humidity-variable-electrical-resistances, I find it advantageous to include a switch 28 (see Fig. 1) in the circuit so that in making a record of the relative humidity in the interior 22 of container 12, as it approaches equilibrium with the paper 13 (Fig. 1) it is possible to turn switch 28 momentarily to supply a record of the temperature superposed on the same chart along with the record of the humidity.

The devices for lifting and for closing and locking the cover may be seen more clearly by reference to Fig. 2. A member 31 is rigidly attached to the walls of container 12. A handle 32 is pivoted at 33 to the fixed member 31 and a projecting arm 34 on handle 32 is pivoted at 35 to a lug 36 projecting upwardly from the center of the cover 11. A grip portion 41 of the handle is pivoted at 42 to the member 31 while a toggle link 43 is pivoted at 44 to the grip portion 41. The end 45 of toggle link 43 is adapted, when grip portion 41 is pulled towards handle 32, to abut against the end of an adjusting screw 46 while collapse of the toggle in the reverse direction is prevented by a projection 47 on link 43 striking the web of grip handle 41 immediately after pivot 44 passes the dead center. This locks the cover 11 tightly onto the container 12. It will be obvious from the broken lines in Fig. 2 how the toggle is broken and the cover 11 lifted from container 12, by pushing the grip portion 41 away from handle 32.

Figure 3:
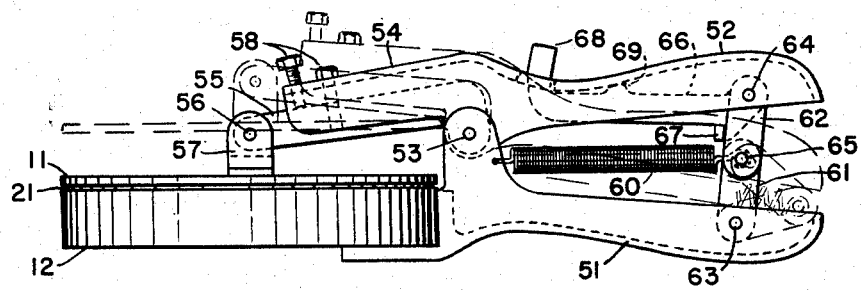
Fig. 3 is a view similar to Fig. 2, but illustrating a modified type of handle and cover-clamping device.

An alternative construction of handle and operating mechanism is illustrated in Fig. 3. In this case handle 51 is rigidly attached to the walls of container 12. The grip portion 52 is pivoted to handle 51 at 53. The oppositely extending arm 54 of the handle 52 is advantageously formed as an inverted channel within which is mounted a lever arm 55, which is also adapted to swing on pivot 53. The arm 55 is also pivoted at 56 to a lug 57 projecting upward from the center of the cover 11, so that movement of arm 55 serves to open and close the covered container 12. Adjusting screws 58 are provided to adjustably fix the angular position of arm 55 relative to the grip portion 52 of the handle and thereby the tightness of the cover 11 when locked in position by the toggle as hereinafter described.

With the arrangement shown, it is clear that squeezing handles 51—52 together will serve to raise the cover 11. In order to close the cover and lock it tightly in position, spring toggle means is provided. Toggle links 61 and 62 are pivoted to handles 51 and 52 by pivots 63 and 64 respectively and are pivoted to each other at 65. An extension spring 60 serves to pull the pivot 65 towards the position shown in Fig. 3, thus forcing the cover 11 downwardly with increasing force in spite of the gradually lessening force of the spring as it contracts. With the toggle in this position, it will prevent any squeezing together of the handles 51—52 and will thus lock the cover 11 in its closed position. In order to break the toggle and permit pressure on the handles to raise the cover 11, I provide lever 66 pivoted within the channel shaped handle 52, on the pivot 64. A lug 67 on lever 66 is adapted to contact toggle link 62, and an upwardly extending push button 68, extends through an opening in the handle 52. Thumb pressure on push button 68 will press lug 67 against toggle link 62, thereby breaking the toggle so that pressure on handles 51—52 will force the toggle into the position indicated by broken lines in Fig. 3, extending spring 66 and lifting cover 11 to permit removal of one paper sample and insertion of another. When the paper sample is inserted, release of the pressure on handles 51—52 permits spring 60 to pull the toggle back into the position shown in solid lines in Fig. 3, thus clamping the cover 11 in position to seal the part of the paper to be tested, within the container 12. To prevent the spring 60 from pulling the toggle beyond the dead center and releasing the pressure on cover 11, a stop 69 is provided on lever 66. This stop 69 contacts the under surface of the handle structure 52, thus serving through lever 66 and lug 67 to prevent movement of the toggle beyond the dead center.

In order that the cover 11 will be clamped down, to hold the paper sample 13 against the gasket 21 with the desired amount of pressure to make an adequate moisture seal during the test, the screws 58 can be adjusted to give the desired tightness while the toggle is in the locking position as shown in solid lines in Fig. 3.

In the use of the invention, the indicator and/or recorder can be calibrated to read directly in percent of relative humidity at a standard temperature, and tables of corrections can be provided to convert the results to percent relative humidity at the actual temperature of each test. If it is not desired to use especially calibrated charts to read directly in terms of relative humidity, standard charts having graduations, from zero to one hundred, or any other range, may be employed and readings converted to percent relative humidity by a suitable scale, table, or diagram.

When a sheet, or a plurality of sheets, of paper are clamped in the container as set forth, the relative humidity in the space 22 within the container immediately begins to approach equilibrium with the moisture content of the paper, but approaches at a decreasing rate in an approximately asymptotic relationship. Even when the equilibrium humidity of the paper and the relative humidity within the container are initially widely different, equilibrium well within the limits of measurement, is usually reached within ten to fifteen minutes. When they are initially reasonably close together, substantial equilibrium is reached and a measurement within the practical limits of accuracy is indicated within three to five minutes or less.

This will be more readily understood by reference to Figs. 6, 7, and 8 which show fragments of autographic recordings of humidity readings in paper samples tested under different conditions. The charts shown are divided horizontally into five-minute intervals and vertically into ten equal spaces. At the left is shown a scale reading in percent of relative humidity at a given temperature. Similar scales can be provided to show the relative humidities at other temperatures, or tables of corrections can be used if preferred.

Fig. 6 shows an autographic record 101 in a case where the relative humidity within the container was, at the start, below 20 percent and the equilibrium humidity of the paper tested was much higher—about 53 percent. At the end of the first five minutes, the indicated relative humidity, as shown by line 101, had reached 49.5 percent. At the end of five more minutes the reading had reached 52.5 percent. In three more minutes the reading had reached 53 percent and from then on the increase was too small to detect.

Fig. 7 shows a record 102 secured where the initial relative humidity within the container was above 60 percent and the equilibrium humidity of the paper was about 39 percent. At the start the current was off and the indicator was at the bottom of the scale. When the sample was inserted and the current turned on, it went up rapidly to about 60 percent which represented the humidity then existing within the container. At the end of the first five minutes the reading had dropped to 42 percent. At the end of five more minutes it was 39.5 percent. By three more minutes it had reached 39 percent and further changes were too small to detect. At the end of 15 minutes the current was turned off and the recorder pen dropped back to the bottom of the chart. The current was then switched to the temperature recorder circuit, the pen moving up to point 103, designating the temperature, which could then be read off of a suitable scale.

Fig. 8 shows four successive records 104, 105, 106, and 107, made in four successive tests in which the relative humidity in the container was only slightly higher than the equilibrium humidity of the paper tested. It will be noted equilibrium was reached in from two to four minutes.

Another method of carrying out the tests is illustrated in Fig. 9. In this method of operation a single recording instrument is used with a plurality of the clamps 10 (Fig. 1). The single recording instrument 16 can be located at an inspection station where it may, if desired, be operated by a trained inspector. The operator of each machine can be supplied with one or more of the clamps 10. As each roll, or package, of paper is completed on his machine he takes a sample—one or more sheets in accordance with the thickness of the paper— and, without unnecessarily exposing it to the air, seals it in one of the clamps 10 and takes it to the inspection station properly identified as to the paper and the time. In this way a series of these accumulate at the inspection station. The inspector takes each in turn, after it has stood for about fifteen minutes. He plugs it into his recording (or indicating) instrument and turns the current into the humidity sensitive element. In this case the air in the container and the humidity sensing element therein have already reached a condition of equilibrium with the enclosed paper sample and the pen on the recorder simply moves until it records this equilibrium humidity. It can then be immediately disconnected. The operation is then repeated for the other samples in turn. The record on the recording chart then appears as illustrated in Fig. 9 with a vertical line for each test, the height of the end of the line showing the equilibrium humidity of that sample. For the first sample the value was 30 percent as shown by end point 111 of the record line. For the second sample the reading was 50 percent as indicated by the end point 112 of the line for that sample, while for the third sample the point 113 indicates an equilibrium humidity of 42 percent. The portion of a chart illustrated in Fig. 9 shows records of successive rolls or packages from three different machines. Readings 111, 114, and 117 refer to successive samples from one machine and show gradually increasing equilibrium humidities of 30 percent, 33 percent, and 35 percent. Record points 112, 115, and 118 relate to successive samples from another machine and show gradually decreasing humidities of 50 percent, 48 percent, and 48 percent, while record points 113, 116 and 119, show humidities of successive samples from a third machine and indicate equilibrium humidities of 42, 44, and 45 percent respectively.

If the instrument had contained an electric temperature sensing element 25, as illustrated in Figs. 4 and 5, there could be a temperature line, similar to the humidity lines shown, located alongside each humidity line, from which the temperature could be read on an appropriate scale. When the tests are carried out in this manner, however, it is possible to eliminate the need for the individual temperature readings, and even the need for any thermometer or temperature sensing elements in the individual clamps, by placing the clamps with the enclosed paper samples, as they are brought to the inspection station, in a storage space which is maintained at the standard temperature, so that, at the time the humidity readings are taken, all clamps are at the standard temperature and records made on a chart calibrated at the standard temperature will require no temperature correction but can be read directly in terms of equilibrium humidity.

The present invention makes it possible to secure samples from a pile or roll and measure their equilibrium humidity with a minimum of exposure to the air and a minimum of opportunity for change of moisture content from the time the sample is taken until it is safely sealed within the measuring chamber. This is possible because, the clamp being portable and adapted to be carried in one hand, it can be taken directly to the pile or roll of paper to be tested. Some of the top sheets on the pile, which may have changed their moisture content by contact with the air, are then lifted (in the case of large sheets only one end or corner need to be lifted) and the clamp slipped and sealed over the edge of one or several of the sheets which have been thus uncovered. The sheets or portions of the sheets held in the clamp, which can be torn off for this purpose if desired, can then be carried to the testing station for making the measurement, if the clamp is not provided with a portable indicator or recorder. For controlling the output of paper making machines or other machines producing paper in roll form, it is customary, as each roll is finished, to remove several layers of paper for test. To determine the moisture content of the paper in that roll, one of the clamps is simply taken to the location of the roll and is slipped and locked over one or more of the innermost layers of the removed paper as soon as it is removed from the roll and without unnecessary exposure to the atmosphere. It is then taken to the measuring station or measured on the spot according to whether a stationary or portable measuring unit is being used. In this manner it is possible to secure periodic checks on moisture content as paper is produced and tendencies to deviate from the specified moisture content can be corrected before the product becomes unacceptable. The method is also useful even on machines equipped with known types of continuous moisture indicators or controllers, since the periodic readings constitute valuable checks on the continuous indicating devices.

In using paper, for printing or other purpose, its equilibrium humidity can advantageously be checked before use. If it is provided with a moisture proof wrapper, this is removed and the paper beneath it may be tested in the manner described. If not so provided, the soiled and/or damaged outer layers which may also have changed their moisture content due to contact with the surrounding atmosphere, are commonly removed and the layers immediately below them may then be tested in the same manner.

The present invention thus makes it possible for the producer to keep a constant watch on processes for producing or converting paper to see that the optimum moisture content is maintained to meet the specifications of customers and to give a paper which will perform best in its intended use. It also enables the printer, convertor, or user of paper to determine in advance whether or not the equilibrium humidity of the paper he is planning to use is such as to adapt it to his process, and thereby to avoid the difficulties which he would encounter in an attempt to use improperly conditioned paper.

While this invention has been described in its use for determining the moisture content of paper, it is also useful for determining moisture content of fabric or other sheet material which has characteristic moisture contents in equilibrium with different relative humidities of the surrounding atmospheres.

I claim:

1. A device for measuring the moisture content of paper in terms of the relative humidity with which it is in equilibrium, which comprises: a container of width substantially greater than its depth, which is open on one of its larger sides; a substantially flat cover for said open side; toggle means connected with said container and said cover for clamping said cover in place to seal a sample of paper within and across the open side of said container, beneath said cover; a humidity-variable-electrical-resistance type of humidity sensing element enclosed within said container adapted for external indication; means for electrically connecting the humidity sensing element to an electrical measuring instrument while the container remains sealed.

2. A device for measuring the moisture content of paper in terms of the relative humidity with which it is in equilibrium, which comprises: a container substantially greater in width than in depth, which is open on one of its larger sides; a cover for said open side; means connected with said container and said cover, for clamping said cover in place to seal said container, said clamping means including means for applying pressure to said cover substantially at its mid point, and a toggle cooperating with said clamping means for applying and maintaining sealing pressure; handle means by which said container can be carried in one hand; a grip portion pivotally associated with said handle and said toggle, which is adapted, by manipulation with one hand to open and close and to lock said cover; and a humidity sensing element enclosed within said container and adapted for external indication.

References Cited in the file of this patent
UNITED STATES PATENTS

| | | |
|---|---|---|
| 1,781,153 | Allen | Nov. 11, 1930 |
| 2,526,636 | Colman | Oct. 24, 1954 |
| 2,713,625 | Johnson et al. | July 19, 1955 |

FOREIGN PATENTS

| | | |
|---|---|---|
| 497,700 | Great Britain | Dec. 23, 1938 |
| 56,009 | Denmark | Apr. 3, 1939 |
| 691,332 | Great Britain | May 13, 1953 |

UNITED STATES PATENT OFFICE
CERTIFICATE OF CORRECTION

Patent No. 2,873,605                                            February 17, 1959

Roger M. Warner

It is hereby certified that error appears in the printed specification of the above numbered patent requiring correction and that the said Letters Patent should read as corrected below.

Column 1, line 18, after "of the mois-" insert -- ture content is commonly desired in these terms because --; line 68, for "incurease" read -- increase --.

Signed and sealed this 29th day of September 1959.

(SEAL)
Attest:

KARL H. AXLINE
Attesting Officer

ROBERT C. WATSON
Commissioner of Patents